US006971404B2

(12) United States Patent
Simmons, Jr.

(10) Patent No.: US 6,971,404 B2
(45) Date of Patent: Dec. 6, 2005

(54) PRESSURE PROTECTION VALVE

(75) Inventor: Charles H. Simmons, Jr., Seattle, WA (US)

(73) Assignee: G.T. Development Corporation, Seattle, WA (US)

( * ) Notice: Subject to any disclaimer, the term of this patent is extended or adjusted under 35 U.S.C. 154(b) by 0 days.

(21) Appl. No.: 10/105,089

(22) Filed: Mar. 20, 2002

(65) Prior Publication Data

US 2003/0178068 A1 Sep. 25, 2003

(51) Int. Cl.⁷ ............................................. F16K 15/02
(52) U.S. Cl. ................. 137/538; 137/533.19; 137/536; 137/540
(58) Field of Search ........................... 137/312, 514.5, 137/536, 538, 540, 542, 543, 543.17, 533.17, 137/533.19, 533.21; 303/28

(56) References Cited

U.S. PATENT DOCUMENTS

| 3,428,070 A | * | 2/1969 | Valnetine ..................... 137/102 |
| 3,993,361 A | * | 11/1976 | Stelzer ........................ 303/64 |
| 4,002,374 A | * | 1/1977 | Horowitz ..................... 303/29 |
| 4,593,954 A | * | 6/1986 | Campanini ..................... 303/7 |
| 4,726,628 A | * | 2/1988 | Vaughn ........................ 303/63 |
| 4,862,913 A | * | 9/1989 | Wildfang ..................... 137/543 |
| 4,907,842 A | * | 3/1990 | Goldfein ..................... 303/13 |
| 5,236,250 A | * | 8/1993 | Moody et al. ................. 303/7 |
| 5,284,384 A | * | 2/1994 | Herring ........................ 303/28 |
| 5,322,353 A | * | 6/1994 | Wallestad ..................... 303/7 |
| 5,445,440 A | * | 8/1995 | Plantan ......................... 303/7 |
| 5,466,053 A | * | 11/1995 | Koelzer ........................ 303/7 |
| 5,722,740 A | * | 3/1998 | Engelbert et al. .......... 303/118.1 |
| 5,917,139 A | * | 6/1999 | Goodell et al. ............... 96/113 |
| 5,967,179 A | * | 10/1999 | Kazakis et al. ............. 137/538 |
| 6,056,007 A | * | 5/2000 | Gochenouer et al. ....... 137/351 |

OTHER PUBLICATIONS

"Air Brake Control Valves for Tractors," ArvinMeritor.com, n.d., <http://www.meritorwabco.com/brakecontrolvalves-fortractors.asp> [retrieved Dec. 20, 2001].
"Air System Components 03," Bendix Catalog, date unknown, pp. 14-38.
"Bendix Trailer System Configurator: Another Industry First," Bendix Commercial Vehicle Systems, n.d., <http://www.mybendix.com/trailerconfig/> [retrieved Dec. 20, 2001].
"BVA-85 Brake Valve Actuator," bendix.com, n.d., <http://www.bendix.com/products/SellSheet?p=BVA85> [retrieved Dec. 20, 2001].

(Continued)

Primary Examiner—Ramesh Krishnamurthy
(74) Attorney, Agent, or Firm—Christensen O'Connor Johnson Kindness PLLC

(57) ABSTRACT

A pneumatic valve (10) for selectively controlling fluid flow through a pneumatic system of a vehicle is disclosed. The valve (10) includes a housing (12) having a cavity (28). The cavity includes an inlet (16) and an outlet (18). A flow controller (40) is disposed within the housing (12) for selectively controlling fluid flow through the housing (12). The flow controller (40) is actuatable to an open position, where the inlet (16) is in fluid communication with the cavity (28) and the outlet (18) is in fluid communication with a pneumatically operated device. The flow controller (40) is also actuatable to a closed position, where the flow controller (40) substantially impedes fluid from flowing through the housing (12). The flow controller (40) is actuatable between the open and closed positions in response to a predetermined fluid pressure within the pneumatic system.

25 Claims, 5 Drawing Sheets

OTHER PUBLICATIONS

"Pressure Protection Valves," *Bendix Service Data—SD-03-2010,* Honeywell Commercial Vehicle Systems Company, Jan. 1999, pp. 1-3.

"Pressure Protection Valve (PR-2 and PR-4)," *Bendix Service Data,* Honeywell Commercial Vehicle Systems Company, date unknown, p. 27.

"Product Application Checklist: Tractor/Truck Air Valve System," Bendix Brakes, date unknown, 2 pages.

"Systems and Components in Commercial Vehicles," *Operating Instructions,* ©WABCO 1998, Chapter 1, "Motor Vehicles," pp. 3-60.

* cited by examiner

PRESSURE PROTECTION VALVE

FIELD OF THE INVENTION

The present invention relates generally to valves for pneumatic systems and, more particularly, to pressure protection valves for pneumatic systems.

BACKGROUND OF THE INVENTION

Pneumatic systems are commonly used in today's industrialized society. Often, a central air compressor is used to simultaneously provide pressurized air to two pneumatic circuits. The first pneumatic circuit is known as a critical circuit, which provides pressurized air to critical components, and the second is commonly referred to as an auxiliary circuit, which serves auxiliary components. If a leak or catastrophic failure occurs in one of the circuits, air pressure may be reduced in the critical circuit to below minimum operating parameters, thereby causing the loss of operation of critical components. To mitigate this effect, a pressure protection valve (hereinafter "PPV") may be installed between the compressor and the auxiliary circuit. The PPV, upon sensing a loss of air pressure in the inlet of the PPV due to a leak or failure in either circuit, will isolate the auxiliary circuit from the compressor, preserving pressurized air for the critical circuit.

One such system where a PPV has found wide spread use is in the motor vehicle manufacturing industry. Motor vehicles, especially in regard to Class 8 vehicles, are manufactured with a pneumatic system that includes a critical circuit and an auxiliary circuit. The critical components served by the critical circuit typically include a primary pneumatic braking system and a secondary pneumatic braking system. The auxiliary circuit typically serves auxiliary components such as an exhaust brake, air horn, or air suspension systems.

Although existing PPVs are effective, they are not without their problems. For example, existing PPVs are typically mounted directly to a pressurized air tank of a motor vehicle. The PPV then either has a large number of threaded fittings on the PPV or it utilizes a separate manifold to distribute air to the various pneumatic circuits that require pressurized air. These fittings often consist of many pipe tees, elbows, and/or hose fittings that are expensive to install and maintain, in both parts and labor, and are prone to leakage.

Further, existing PPVs typically have pressure vessels that are round in shape. Although the round design is effective in containing pressure, it results in poor shut-off angles if the PPV was to have many outlet fittings and be formed by injection molding or die-casting. More specifically, if the PPV with multiple outlet fittings was to be formed by injection molding or die-casting, a large "pin" having a round cross-section and an outer surface that mirrors the desired shape of the interior of the product is inserted into one end of the product mold prior to injection or casting. Then, a second set of smaller pins is inserted through the sides of the product mold to form the apertures for the fittings. The pins must engage and seal the sharply curved surface of the large pin from infiltration of the high-pressure injection material or casting material. Since this is difficult to perform properly, imperfections often result due to the poor shut-off angles provided by a round pressure vessel. Therefore, existing PPVs are limited to a few outlet fittings so as to provide favorable shut-off angles to facilitate the molding process.

In addition, existing PPVs are constructed in a manner that restricts flow past the control piston. Referring to FIG. 1, which depicts a representative prior art design, the piston 6 is guided by support structures 8, which substantially surround the circumference of the piston 6. Therefore, existing piston guide support structures 8 tend to unduly restrict flow past the piston 6.

SUMMARY OF THE INVENTION

In accordance with one embodiment of the present invention, a pneumatic valve for selectively controlling fluid flow through a pneumatic system of a vehicle is provided. The pneumatic valve includes a housing having a cavity, an inlet in selective fluid communication with the cavity, and an outlet. The pneumatic valve is adapted to be coupled to a pneumatic system of a vehicle, where the inlet is in fluid communication with a pneumatic source and the outlet is in fluid communication with a pneumatically operated device. A flow controller is disposed within the housing for selectively controlling fluid flow through the housing when the pneumatic valve is coupled to the pneumatic system. The flow controller is actuatable between an open position, where the inlet is in fluid communication with the cavity and the outlet is in fluid communication with the pneumatically operated device, and a closed position, where the flow controller substantially impedes fluid from flowing through the housing. The flow controller is actuatable between the open and closed positions in response to a predetermined fluid pressure within the pneumatic system.

In accordance with further aspects of one embodiment of the present invention, the flow controller comprises a first end and a second end. When the pneumatic valve is coupled to the pneumatic system, the first end is exposed to a first fluid pressure substantially equal to a pressure within the pneumatic system and the second end is exposed to a second fluid pressure substantially equal to atmospheric pressure. In accordance with still further aspects of one embodiment of the present invention, the pneumatic valve includes a vent to maintain the second fluid pressure at a substantially constant level.

In accordance with yet still further aspects of one embodiment of the present invention, the housing extends outward to partially shield the vent so as to substantially impede the entrance of contaminates through the vent and into the housing, while still allowing the vent to maintain the second fluid pressure at a substantially constant level.

In accordance with additional aspects of one embodiment of the present invention, the flow controller is biased toward the first end by a biasing member. In accordance with further additional aspects of one embodiment of the present invention, the biasing member is a spring that provides a predetermined pre-load upon the flow controller. The pre-load counteracts the first fluid pressure to bias the flow controller into the closed position, while permitting the flow controller to actuate into the open position when the first fluid pressure creates an opposing load to overcome the pre-load.

In accordance with still further additional aspects of one embodiment of the present invention, the pneumatic valve further comprises a plurality of guides formed with the housing for engagement with the flow controller. The plurality of guides engage a portion of the flow controller without substantially impeding fluid flow through the housing when the pneumatic valve is coupled to the pneumatic system and the flow controller is actuated between the open and closed positions. In another embodiment of the invention, the pneumatic guide includes three or four guides formed with the housing and spaced from each other for engagement with the flow controller.

In other aspects of one embodiment of the present invention, the housing is contoured in a predetermined shape, such that an axis extending longitudinally through the outlet is substantially perpendicular to an axis extending longitudinally through the housing. In still other aspects of another embodiment of the present invention, the predetermined shape of the housing is substantially oval in cross-section. In yet still other aspects of one embodiment of the present invention, the housing is formed from a non-metallic material.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 6 is a cross-sectional view taken substantially through Section 6—6 of the PPV shown in FIG. 4, prior to the cross-sectioning of the PPV, depicting the PPV's piston and the surrounding piston guide support structures.

DETAILED DESCRIPTION OF THE PREFERRED EMBODIMENT

FIGS. 2–6 illustrate one embodiment of a PPV 10 constructed in accordance with the present invention. The PPV 10 is designed to be used as a control valve within a pneumatic system. More specifically, the PPV 10 is designed to cut off flow to one or more outlets in the event the inlet pressure to the PPV 10 falls below a predetermined pressure. For illustrative purposes, the illustrated embodiment of the present invention will be described as implemented as a PPV 10 for a pneumatic braking system of a motor vehicle. However, one skilled in the relevant art will appreciate that the disclosed PPV has wide application and is not to be construed as limited to application within a motor vehicle, nor solely with pressurized air, as the present invention may be suitably used with most any pressurized fluid.

Figure 1:
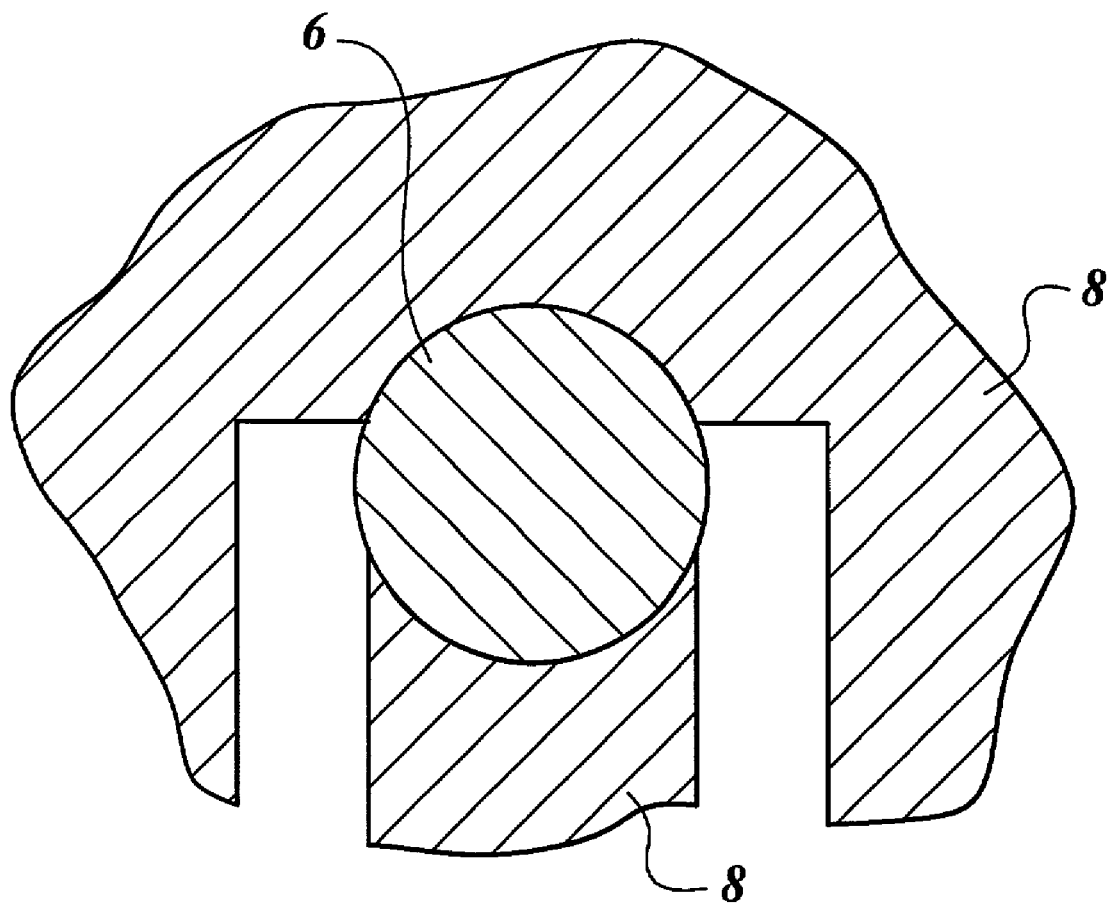
FIG. 1 is a fragmentary, cross-sectional end view of a prior art piston and surrounding piston support structures, illustrating how the piston support structures of prior art designs occupy a substantial portion of the circumference of the piston, thereby restricting flow.
Figure 2:
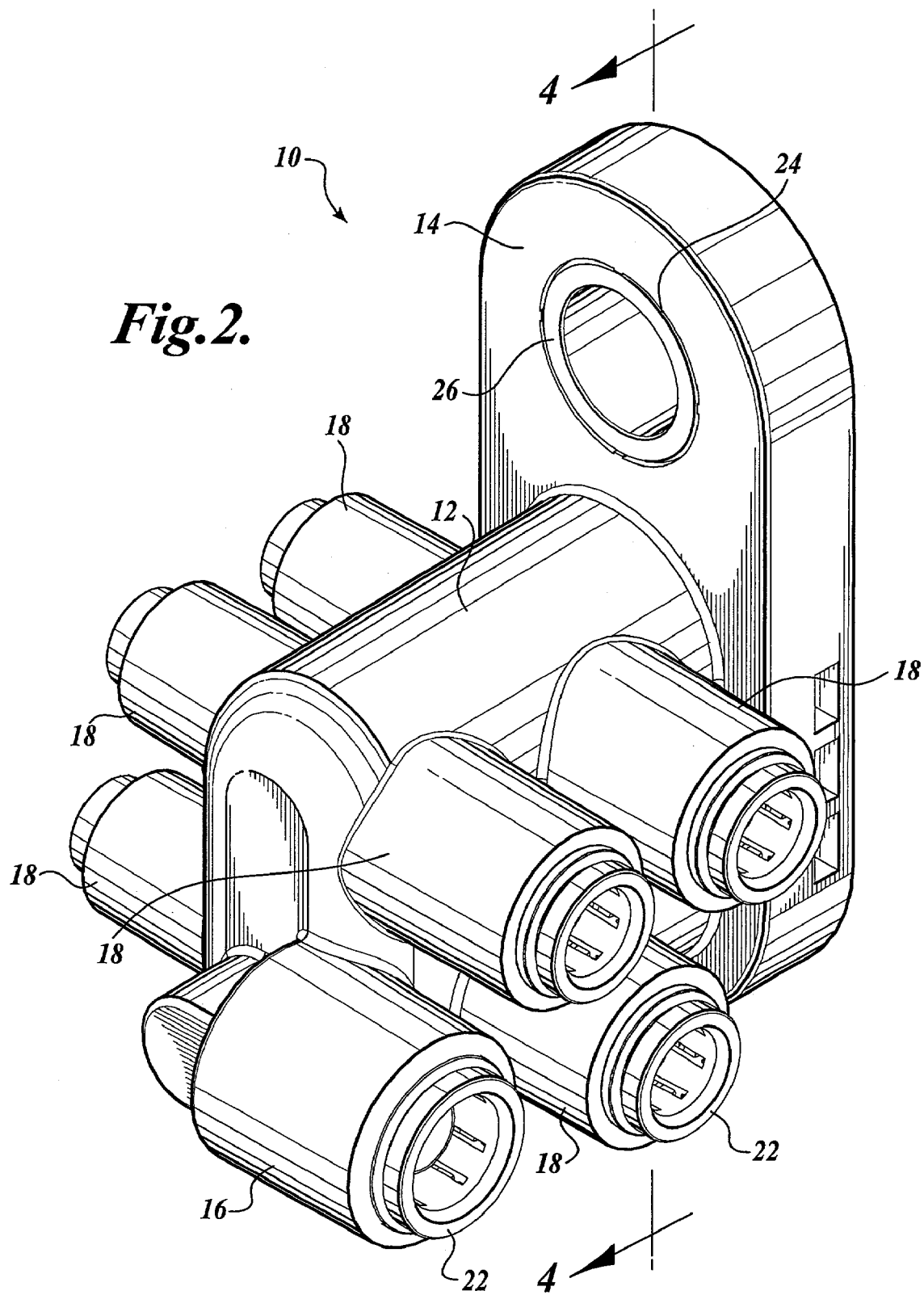
FIG. 2 is a perspective view of one embodiment of a PPV, formed in accordance with the present invention.

Referring to FIG. 2, the PPV 10 includes a main housing 12 and a base 14. Disposed on the main housing 12 is an inlet 16 and multiple outlets 18 of varying sizes. Although the illustrated embodiment depicts seven outlets 18 (one not shown in FIG. 2), it should be apparent to one skilled in the art that other quantities of fittings may suitably be used and are within the scope of the present invention. The inlet and outlets 16 and 18 include well-known push-to-connect fittings 22. The push-to-connect fittings 22 allow the quick and easy connection of tubing coupling various auxiliary components of the motor vehicle requiring pressurized air to the outlets 18, such as an exhaust brake. The push-to-connect fitting 22 of the inlet 16 likewise allows the quick and easy coupling of the PPV 10 in gas flow communication with the motor vehicle's air compressor. Although push-to-connect fittings 22 are shown in the illustrated embodiment, it should be apparent that other fittings, such as threaded fittings or barbed hose fittings, are suitably used and are within the scope of the present invention.

Figure 3:
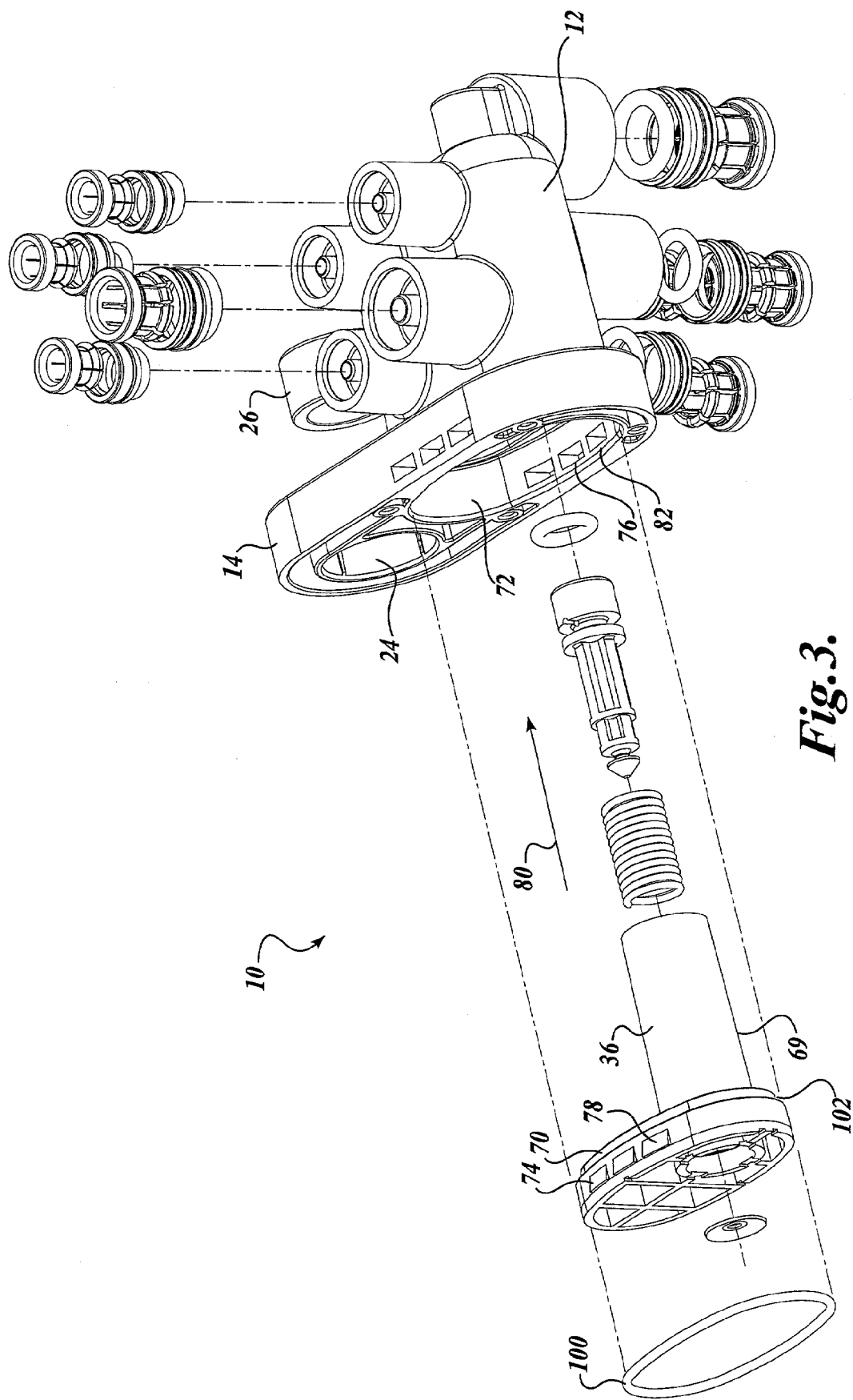
FIG. 3 is an exploded view of the PPV shown in FIG. 2, illustrating the major elements of the PPV.

Referring now to FIGS. 2 and 3, the main housing 12 is a hollow, elongate member having an oval-shaped end profile, which is perpendicularly mounted to the base 14. Inasmuch as the main housing 12 is oval in shape, the outlets 18 may be mounted substantially perpendicular to the linear sides of the oval-shaped main housing 12 to provide near optimum shut-off angles during injection molding of the main housing 12 and inlet and outlets 16 and 18. Further, the linear sides of the oval provide ample surface area to mount multiple outlets 18. However, inasmuch as the oval-shaped structure tends to provide less structural integrity than the existing round housing designs, an additional structural web 88 (see FIGS. 4 and 6) may be provided that extends through the cavity 28 of the main housing 12, thereby enhancing the structural integrity of the main housing 12.

The base 14 is an oval-shaped structure mounted perpendicularly to the central axis of the main housing 12. In the preferred embodiment, the base 14, main housing 12, and inlet and outlets 16 and 18 are integrally formed from a rigid material, such as glass-filled nylon, by injection molding. Integrally forming the inlet and outlets 16 and 18 reduces the number of fittings mechanically coupled to the main housing 12, thereby reducing the potential for leaks and failures.

A mounting aperture 24 is located at one end of the oval shape of the base 14. The mounting aperture 24, consisting of a perpendicularly-oriented bore, is formed in the base 14. A bushing 26, preferably of a non-corrosive, rigid material—such as zinc-plated steel, stainless steel, or aluminum—is press-fit within the aperture 24 to provide structural strength for securely mounting the PPV 10 valve to a frame of the motor vehicle, air tank, or other structure of the motor vehicle.

Figure 4:
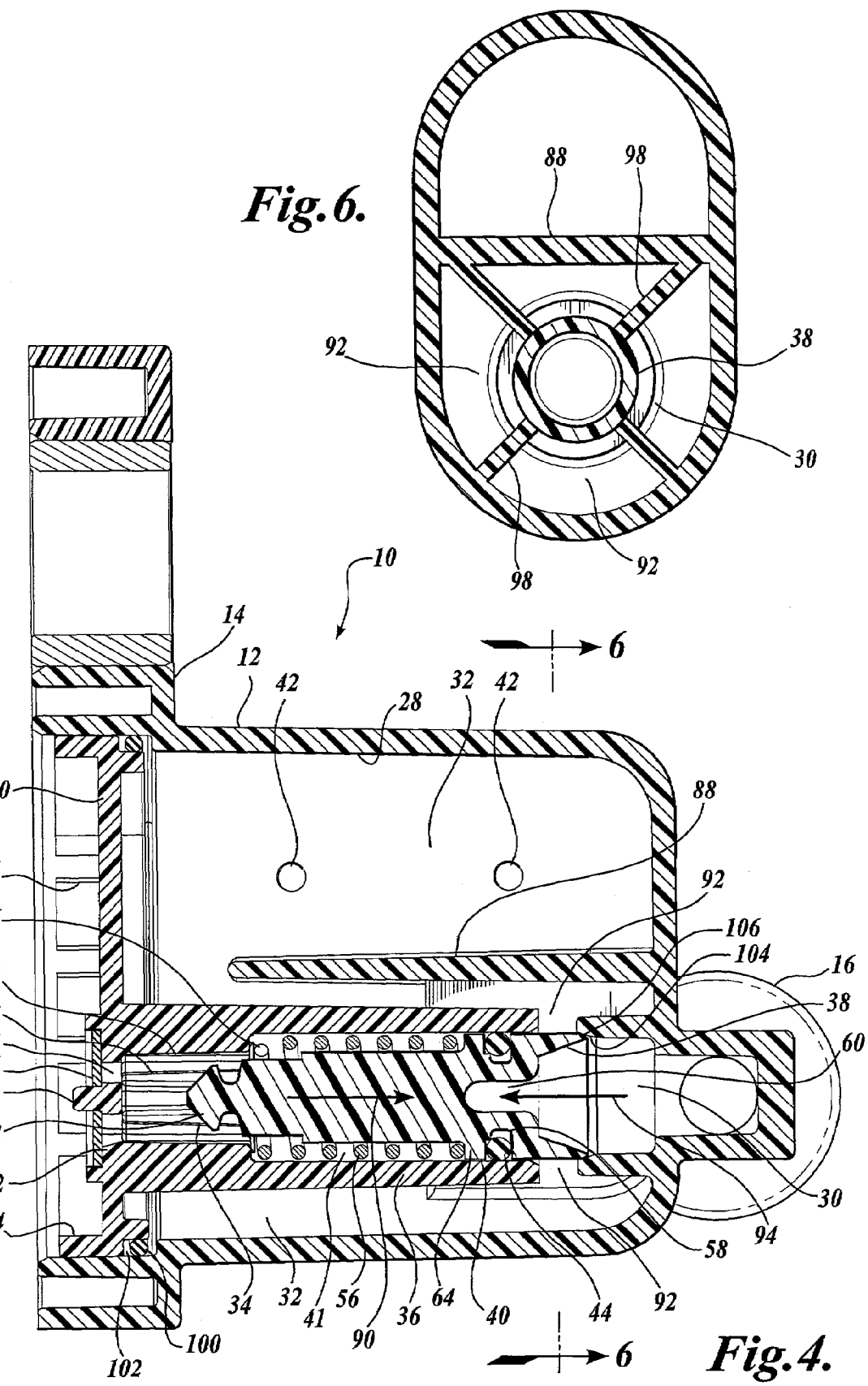
FIG. 4 is a cross-sectional view of the PPV, taken substantially through Section 4—4 of the PPV shown in FIG. 2, depicting the PPV in the closed position.

In light of the above description of the outer elements of the PPV 10, the inner elements of the PPV 10 will now be described. Referring now to FIGS. 3 and 4, the main housing 12 further includes a cavity 28. The cavity 28 may be divided into three pressure zones or chambers: an inlet chamber 30, outlet chamber 32, and an atmospheric chamber 34. Further, the cavity includes a piston housing 36. The inlet chamber 30 is a cylindrically-shaped chamber and is coupled in gas flow communication with the inlet 16 of the PPV 10. The inlet chamber 30 is subject to the highest pressure of the system, which, in regard to application of the present invention with a motor vehicle, is typically in the range of 100 to 150 psi—although it is apparent to one skilled in the art that the present invention has wide application and may be suitably used with applications operating within other pressure ranges.

The pressure contained within the inlet chamber 30 acts upon a head 38 of a piston 40. When the inlet pressure is within operating parameters, the piston 40 is urged outward from the inlet chamber 30, as will be described in more detail below. As the piston 40 moves a predetermined distance, it allows the pressurized air in the inlet chamber 30 to be released into the outlet chamber 32.

The outlet chamber 32 is defined by the inner surface of the main housing 12 and is oval-shaped in cross section. The outlets are coupled in gas flow communication to the outlet chamber 32 through corresponding outlet ports 42. The pressure within the outlet chamber 32, during normal operation, is substantially equal to the inlet pressure; however, it may at times be slightly less due to friction losses and expansion of the pressurized air as the air travels past the piston 40.

The outlet chamber 32 substantially surrounds the piston housing 36, thereby providing, among other benefits, a second protective barrier. The first protective barrier is provided by the piston housing 36 itself surrounding the piston bore 41, thereby reducing the potential for mishandling damage to the piston bore 41. Although it is preferred that the piston housing 36 is substantially encased by the outlet chamber 32, it should be apparent to one of ordinary skill in the art that the invention is intended to be so limited. As a non-limiting example, when the PPV 10 is coupled to a mounting surface (not shown), such as to a frame of a motor vehicle, the piston housing 36 is fully encased by the outlet chamber 32 in combination with the mounting surface. Such an embodiment is also within the scope of the present invention. Therefore, as used within this detailed description, the phrase "substantially encased" also includes embodiments where the piston housing 36 is encased by the outlet chamber 32 in combination with the mounting surface.

The third chamber is the atmospheric chamber 34. The atmospheric chamber 34 is a cylindrically-shaped chamber located at the opposite end of the piston 40 from the inlet chamber 30. An O-ring 44 circumferentially oriented on the piston 40 substantially seals the atmospheric chamber 34 from the relatively high pressures found in the outlet and inlet chambers 30 and 32. As the name implies, the atmospheric chamber 34 is preferably maintained substantially at atmospheric pressure. A vent is provided to maintain this chamber at atmospheric pressure in the event of pressurized air blowing by the O-ring 44.

Still referring to FIGS. 3 and 4, the internal components of the piston housing 36 will now be described. The piston housing 36 houses a spring 56, the piston 40, and the O-ring 44. The piston is a solid, elongate cylindrical member having an annular groove to receive the O-ring 44 or other sealing mechanism, such as a lip seal, a countersunk head 38 with a centrally located bore 60, and on the opposite end of the piston 40, a mushroom shaped head 62. The spring 56 is compressed between an annular circumferentially-oriented lip 64 on the piston 40 and the ends 66 of a series of longitudinally-oriented webs 68, thereby biasing the piston towards the inlet chamber 30. Depending upon the uncompressed free length of the spring 56, the spring's spring constant (i.e., stiffness), and the installed height (i.e., the amount of initial compression of the spring), the spring 56 acts upon the piston 40 to provide predetermined amount of pre-load, biasing the piston 40 in the closed position.

As can best be seen in FIG. 3, the piston housing 36 is formed by an elongate cylinder 69 formed integrally with an end cap 70. The end cap 70 is sized and dimensioned to be received within an oval-shaped aperture 72 in the main housing 12. Six tines 74 are spaced around the periphery of the end cap 70. Correspondingly-shaped tine-receiving apertures 76 are spaced around the oval-shaped aperture 72 in the main housing 12. The outer walls 78 of the tines 74 are sloped outwardly. During assembly, the end cap 70 is pressed into the main housing 12 in the direction of the arrow indicted by the reference numeral 80. As the end cap is pressed into the main housing 12, the upper edge of the inner wall 82 of the oval shaped aperture 72 contacts the sloped outer walls 78 of the tines 74, pressing them inward.

As the end cap 70 is pressed all the way within the oval-shaped aperture 72, the tines 74 spring outward and into the tine receiving apertures 76 of the main housing 12, coupling the end cap 70 to the main housing 12 in an inexpensive, quick, and effective manner. An O-ring 100 is disposed within a channel 102 located around the periphery of the base of the end cap 70. As shown in FIG. 4, when the end cap 70 is pressed into the main housing 12, the O-ring 100 is sandwiched between the base the of the end cap 70 and the base 14 of the main housing 12 in sealing engagement, thereby sealing the outlet chamber 32 from the atmosphere.

Referring to FIG. 4, it is advantageous to impede the passage of contaminates, such as water and dirt, into the piston housing 36 since they may deteriorate the performance of the PPV 10. However, the piston housing 36 must also be opened to the environment to allow atmospheric pressure in to the atmospheric chamber 34 and allow any piston blow-by to vent. Therefore, there is necessarily a potential opening where contaminates may enter the main housing 12.

In the present invention, one method of impeding contaminate entrance is provided by a labyrinth vent design. The labyrinth vent design provides a tortuous path between the outside environment and the opening in the main housing 12 to impede the entrance of contaminates. In creating the labyrinth vent, the base 14 is mounted to the frame (not shown) of the motor vehicle, thereby substantially blocking off an inner recess 84 of the end cap from contaminate entrance. Further, the assembly tines 74 have a width slightly less than the width of the tine receiving apertures 76, thereby creating gaps 86 that allow any piston blow-by to vent, while still impeding the entrance of any contaminates.

Although the labyrinth vent design typically sufficiently impedes the entrance of contaminates, an optional disk-shaped splash shield 46 may be disposed at the outer end of the cylindrically shaped atmospheric chamber 34. The optional splash shield 46 serves as a cover, providing secondary protection against the passage of contaminates, such as water and dirt, into the main housing 12, while still allowing the passage of any O-ring blow-by to vent from the atmospheric chamber 34. To accomplish both these functions (contaminate blockage and venting), the splash shield 46 is formed from a flexible membrane, such as rubber or other material well known in the art. The disk-shaped splash shield 46 has a centrally located aperture that is mounted on a tapered post 48 by a well-known fastener, such as an E-clip or the like. The fastener secures the central portion of the splash shield 46 to the tapered post 48, allowing the outer portion of the splash shield 46 to flex. In normal operation, the splash shield 46 is biased by the semi-rigidity of the flexible membrane in a closed/sealing position against a shield receiving recess 52 in the main housing 12, impeding contaminate entrance. When blow-by passes the O-ring 44, the blow-by air overcomes this bias and lifts or flexes the flexible membrane around the outer periphery of the splash shield 46, allowing the blow-by air to vent to the atmosphere through two vent apertures 54.

In light of the above description of the structures of the illustrated embodiment of the present invention, the operation of the illustrated embodiment will now be described. Referring to FIG. 2, an inlet line (not shown) is coupled to the inlet 16. Preferably, the inlet line is constructed from flexible tubing and is in gas flow communication with the air compressor (not shown) or an intermediate device (such as an air dryer, air tank, unloader, etc.) which is supplied pressurized air by the compressor. The inlet line includes a male push-to-connect fitting formed to correspond with the push-to-connect fitting 22 of the inlet 16. Likewise, each outlet 18 is coupled to outlet lines (not shown), thereby coupling the PPV 10 to auxiliary devices requiring pressurized air, such as an exhaust brake, air suspension, or other such systems. Although not shown, the air compressor also provides air to a critical circuit, serving components such a primary and secondary braking systems.

FIG. 4 depicts the PPV 10 in a closed position. In the closed position, the PPV valve blocks the delivery of pressurized air to each of the outlets 18. The PPV 10, in sensing a low inlet pressure, such as 65 psi, will actuate from the open position (shown in FIG. 5) to the closed position (shown in FIG. 4). In the closed position, the auxiliary systems will be blocked from receiving pressurized air, thereby preserving pressurized air for the mission-critical systems, such as the brakes. Of note, preferably the auxiliary systems are shut off at a pressure above the minimum operating pressure of the critical components. For example, in the illustrated embodiment, the PPV closes at 65 psi, 10 psi above the 55-psi minimum operating pressure of the brakes. As air pressure is returned to a satisfactory operating level, such as 85 psi, the PPV 10 will actuate from the closed position to the open position, redelivering pressurized air to the auxiliary systems.

Figure 5:
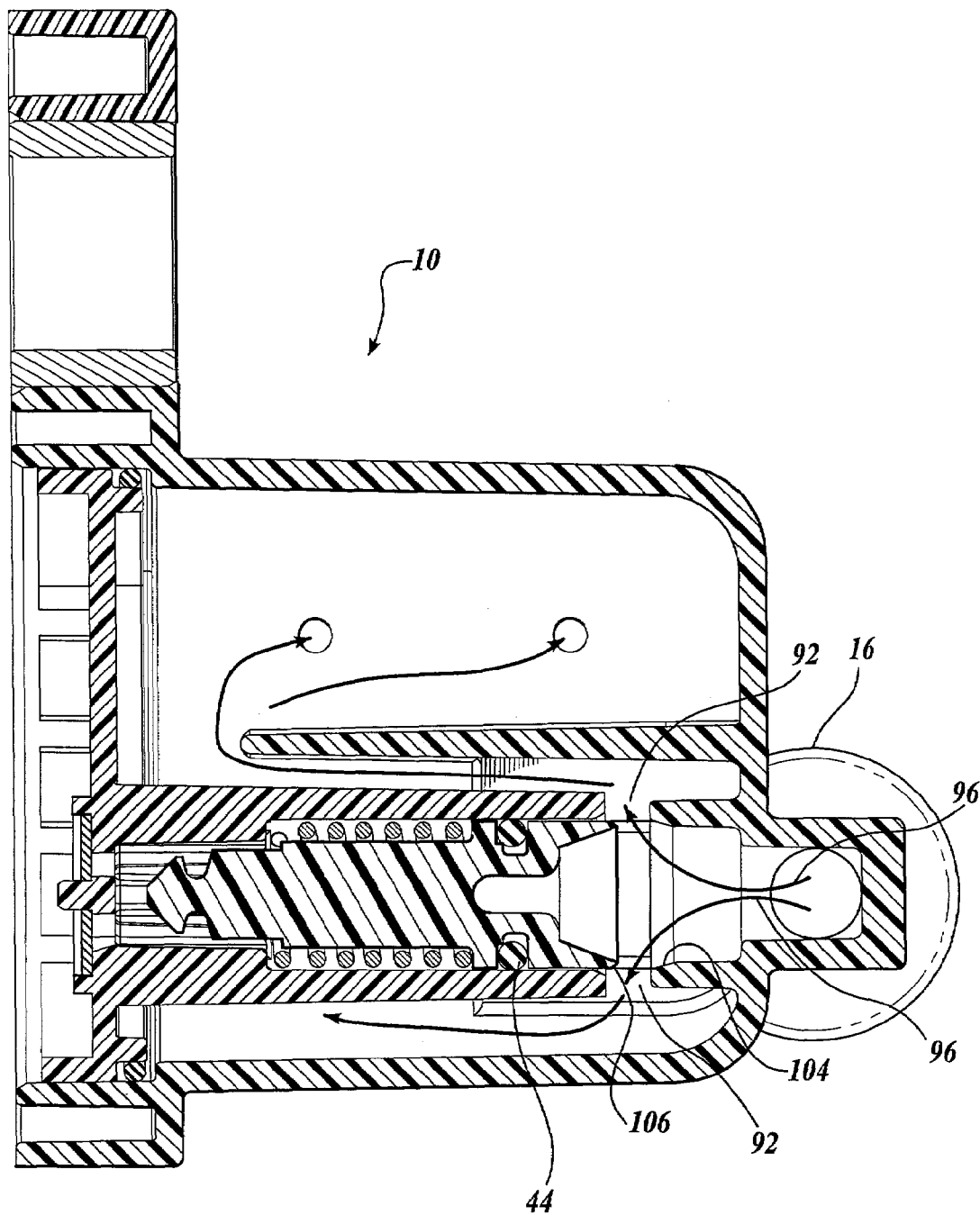
FIG. 5 is a cross-sectional view of the PPV, taken substantially through Section 4—4 of the PPV shown in FIG. 2, depicting the PPV in the open position.

Referring to FIGS. 4 and 5, the process by which the PPV 10 is actuated between the closed and open positions will now be described in further detail. Prior to the starting of the air compressor, the air pressure in the system is equal to atmospheric pressure. In this condition, as shown in FIG. 4, the pre-load provided by the compressed spring 56 upon the piston 40 forces the piston 40 in the direction of the arrow indicated by the reference numeral 90, thereby sealingly engaging the piston with the inlet chamber 30. In this position, the piston seals an array of four flow apertures 92, only two of which are shown in FIGS. 4 and 5. The flow apertures 92 allow the passage of pressurized air from the inlet 16 into the outlet chamber 32, and thus the outlet ports 42. As the compressor is started and pressure builds in the system, pressurized air enters the inlet chamber 30 and acts upon the head 38 of the piston 40. As the pressure builds to a satisfactory operating pressure, such as 85 psi, the pre-load of the spring 56 is overcome and the piston moves in the direction of the arrow indicated by reference numeral 94, placing the piston 40 in the open position depicted in FIG. 5.

Referring to FIG. 5, with the piston 40 in the open position, flow apertures 92 are now in gas flow communication with the inlet 16. Thus, pressurized air 96 flows past the piston 40 and through the flow apertures 92, delivering pressurized air to the auxiliary systems. Although the piston moves to the open position at a satisfactory operating pressure, such as 85 psi, the valve closes at a lower pressure, such as 65 psi, due to the friction of the O-ring 44 and a change in an effective surface area of the head of the piston 38 acted upon by the pressurized air 96 in the inlet chamber 30. More specifically, the diameter of the effective surface area is equal to the inner diameter of the piston housing 36 when the PPV 10 is in the open position. However, when the PPV 10 is in the closed position depicted in FIG. 4, the effective surface area is reduced when a radiused outer edge 106 of the head 38 of the piston 40 sealingly engages a tapered seat 104 in the inlet chamber 30. As is apparent to one skilled in the art, reducing the effective surface area correspondingly reduces the downward force applied by the pressurized air 96 upon the piston 40, since the force is a function of the surface area and air pressure. Thus, there is a pressure differential between the pressure at which the PPV is actuated to the open position and the pressure at which the PPV is actuated to the closed position, such as 20 psi in this instance. Thus, auxiliary air is not redelivered until the system is returned to a satisfactory pressure well above the minimum required for safe brake operation (55 psi). Although specific pressures have been disclosed for illustrative purposes, it should be apparent to one skilled in the art that other pressures are suitably used and within the scope of the present invention.

Referring to FIGS. 4 and 6, the piston 40 guide structures will be described in further detail. With the piston 40 in the closed position, as depicted in FIG. 4, the head 38 of the piston 40 engages and is slightly received within the inlet chamber 30, blocking the pressurized inlet air from flowing through the flow apertures 92. As the inlet pressure increases and the piston 40 is moved toward the atmospheric chamber 34, the piston is disengaged from the inlet chamber 30 and flow through the flow apertures 92 occurs. Referring to FIG. 6, to guide and stabilize the piston 40 once it disengages from the inlet chamber 30, four longitudinally-aligned guide webs 98 (not shown in FIG. 4) are disposed at four locations around the periphery of the piston 40. The guide webs 98 provide sufficient support to the piston 40, while presenting only a minimal restriction in flow. Further, in the preferred embodiment, the guide webs 98 extend down and engage the piston housing 36, stabilizing the piston housing 36 within the main housing 12. Although four guide webs 98 are depicted in the illustrated embodiment, it will be appreciated by one skilled in the art that other quantities of guide webs 98—such as three, for example—are suitable for use with the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A pneumatic valve for selectively controlling fluid flow through a pneumatic system of a vehicle, the pneumatic valve comprising:

(a) a housing having a cavity, an inlet in selective fluid communication with the cavity, and an outlet, the pneumatic valve adapted to be coupled to a pneumatic system of a vehicle, where the inlet is in fluid communication with a pneumatic source and the outlet is in fluid communication with a pneumatically operated device;

(b) a flow controller disposed within the housing for selectively controlling fluid flow into the housing when the pneumatic valve is coupled to the pneumatic system, the flow controller being actuatable between an open position, where the inlet is in fluid communication with the cavity and the outlet is in fluid communication with the pneumatically operated device, and a closed position, where the flow controller substantially impedes fluid from flowing into the housing, the flow controller being actuatable between the open and closed positions in response to a predetermined fluid pressure within the pneumatic system, wherein the housing is contoured in a predetermined shape, such that an axis extending longitudinally through the outlet is substantially perpendicular to an axis extending longitudinally through the housing, wherein the predetermined shape of the housing is substantially oval; and (c) a plurality of guides formed with the housing for engagement with the flow controller, the plurality of guides engaging a portion of the flow controller without substantially impeding fluid flow into the housing when the pneumatic valve is coupled to the pneumatic system.

2. The pneumatic valve of claim 1, wherein when the pneumatic valve is coupled to the pneumatic system, a first end of the flow controller is exposed to a first fluid pressure substantially equal to a pressure within the pneumatic system, and a second end of the flow controller is exposed to a second fluid pressure substantially equal to atmospheric pressure.

3. The pneumatic valve of claim 2, further comprising a vent in fluid communication with the cavity to maintain the second fluid pressure at a substantially constant level.

4. The pneumatic valve of claim 3, wherein the housing includes a recess sized and configured to substantially impede entrance of contaminates through the vent.

5. The pneumatic valve of claim 2, further comprising a vent for venting a pressurized fluid from the second end of the flow controller, wherein the vent comprises a flexible membrane normally biased in a closed position, where the second fluid pressure acts upon the flexible membrane to bias the flexible membrane in an open position, wherein when the second fluid pressure exceeds a predetermined pressure the vent is actuated into the open position by the flexing of the flexible membrane, thereby maintaining the second fluid pressure at a substantially constant level.

6. The pneumatic valve of claim 2, wherein the flow controller is biased toward the first end by a biasing member.

7. The pneumatic valve of claim 6, wherein the biasing member is a spring that counteracts the first fluid pressure to bias the flow controller into the closed position and permits the flow controller to actuate into the open position when the first fluid pressure overcomes the spring.

8. The pneumatic valve of claim 1, further comprising at least three guides formed with the housing for engagement with the flow controller, the at least three guides engaging a portion of the flow controller without substantially impeding fluid flow into the housing.

9. The pneumatic valve of claim 1, further comprising a plurality of outlets formed with the housing, wherein each outlet of the plurality of outlets includes a longitudinally extending axis that is substantially perpendicular to the axis extending longitudinally through the housing.

10. The pneumatic valve of claim 1, wherein the housing is formed from a non-metallic material.

11. The pneumatic valve of claim 1, wherein the flow controller is disposed within a casing which is disposed within the cavity of the housing.

12. A pneumatic valve for selectively controlling fluid flow through a pneumatic system of a vehicle, the pneumatic valve comprising:

(a) a housing having a cavity, an inlet in selective fluid communication with the cavity, an outlet disposed on a first wall of the housing, the pneumatic valve adapted to be coupled to a pneumatic system of a vehicle, where the inlet is in fluid communication with a pneumatic source and the outlet is in fluid communication with a pneumatically operated device, wherein the housing is contoured in a predetermined shape such that the first wall of the housing is substantially parallel to a second wall of the housing, wherein the first wall and the second wall are substantially planar; and (b) a flow controller disposed within the housing for selectively controlling fluid flow into the housing when the pneumatic valve is coupled to the pneumatic system, the flow controller being actuatable between an open position, where the inlet is in fluid communication with the cavity and the outlet is in fluid communication with the pneumatically operated device, and a closed position, where the flow controller substantially impedes fluid from flowing into the housing, the flow controller being actuatable between the open and closed positions in response to a predetermined fluid pressure within the pneumatic system, wherein when the pneumatic valve is coupled to the pneumatic system, a first end of the flow controller is exposed to a first fluid pressure substantially equal to a pressure within the pneumatic system, and the second end is exposed to a second fluid pressure substantially equal to atmospheric pressure.

13. The pneumatic valve of claim 12, wherein the predetermined shape of the housing is substantially oval.

14. The pneumatic valve of claim 12, further comprising a vent for venting a pressurized fluid from the second end of the flow controller, wherein the vent comprises a flexible membrane normally biased in a closed position, where the second fluid pressure acts upon the flexible membrane to bias the flexible membrane in an open position, wherein when the second fluid pressure exceeds a predetermined pressure the vent is actuated into the open position by the flexing of the flexible membrane, thereby maintaining the second fluid pressure at a substantially constant level.

15. The pneumatic valve of claim 12, wherein the housing includes a recess sized and configured to substantially impede entrance of contaminates through the vent.

16. The pneumatic valve of claim 12, wherein the flow controller is biased toward the first end by a biasing member.

17. The pneumatic valve of claim 16, wherein the biasing member is a spring that counteracts the first fluid pressure to bias the flow controller into the closed position and permits the flow controller to actuate into the open position when the first fluid pressure overcomes the spring.

18. The pneumatic valve of claim 12, further comprising a plurality of guides formed with the housing for engagement with the flow controller, the plurality of guides engaging a portion of the flow controller without substantially impeding fluid flow into the housing when the pneumatic valve is coupled to the pneumatic system.

19. The pneumatic valve of claim 12, further comprising a plurality of outlets formed with the housing and disposed on the first wall and the second wall, such that an axis extending longitudinally through each outlet is substantially perpendicular to the first wall and the second wall.

20. The pneumatic valve of claim 12, wherein the housing is formed from a non-metallic material.

21. The pneumatic valve of claim 12, wherein the housing includes a web extending through the cavity of the housing to assist in maintaining the predetermined shape of the housing when the housing is subject to an internal pressure.

22. The pneumatic valve of claim 12, wherein the flow controller is disposed within a casing which disposed within the cavity of the housing.

23. The pneumatic valve of claim 12, wherein the housing is contoured in a predetermined shape, such that an axis extending longitudinally through the outlet is substantially perpendicular to an axis extending longitudinally through the housing.

24. A pneumatic valve for selectively controlling fluid flow through a pneumatic system of a vehicle, the pneumatic valve comprising:

(a) a housing having a cavity, an inlet in selective fluid communication with the cavity, and an outlet, the pneumatic valve adapted to be coupled to a pneumatic system of a vehicle, where the inlet is in fluid communication with a pneumatic source and the outlet is in fluid communication with a pneumatically-operated device, wherein the housing includes a web extending through the cavity of the housing to assist in maintaining a predetermined shape of the housing when the housing is subject to an internal pressure; and (b) a flow controller enclosed within a casing which is disposed within the cavity of the housing, the flow controller operable for selectively controlling fluid flow into the housing when the pneumatic valve is coupled to the pneumatic system, the flow controller being actuatable between an open position, where the inlet is in fluid communication with the cavity and the outlet is in fluid communication with the pneumatically-operated device, and a closed position, where the flow controller substantially impedes fluid from flowing into the housing, the flow controller being actuatable between the open and closed positions in response to a predetermined fluid pressure within the pneumatic system.

25. A pneumatic valve for selectively controlling fluid flow through a pneumatic system of a vehicle, the pneumatic valve comprising:

(a) a housing having a cavity, an inlet in selective fluid communication with the cavity, and an outlet, the pneumatic valve adapted to be coupled to a pneumatic system of a vehicle, where the inlet is in fluid communication with a pneumatic source and the outlet is in fluid communication with a pneumatically operated device;

(b) a flow controller disposed within the housing for selectively controlling fluid flow into the housing when the pneumatic valve is coupled to the pneumatic system, the flow controller being actuatable between an open position, where the inlet is in fluid communication with the cavity and the outlet is in fluid communication with the pneumatically operated device, and a closed position, where the flow controller substantially impedes fluid from flowing into the housing, the flow controller being actuatable between the open and closed positions in response to a predetermined fluid pressure within the pneumatic system, wherein the housing is contoured in a predetermined shape, such that an axis extending longitudinally through the outlet is substantially perpendicular to an axis extending longitudinally through the housing, wherein the housing includes a web extending through the cavity of the housing to assist in maintaining the predetermined shape of the housing when the housing is subject to an internal pressure; and (c) a plurality of guides formed with the housing for engagement with the flow controller, the plurality of guides engaging a portion of the flow controller without substantially impeding fluid flow into the housing when the pneumatic valve is coupled to the pneumatic system.

* * * * *